United States Patent
Oag et al.

(10) Patent No.: US 11,940,674 B2
(45) Date of Patent: Mar. 26, 2024

(54) METHOD OF DESIGNING A FLUID-FILLED CONTACT LENS

(71) Applicant: CooperVision International Limited, Fareham (GB)

(72) Inventors: Robert Oag, Southampton (GB); Ian Bruce, Southampton (GB); Robin Frith, Southampton (GB); Percy Lazon de la Jara, San Ramon, CA (US); Rachel Marullo, Oakland, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 455 days.

(21) Appl. No.: 17/066,506

(22) Filed: Oct. 9, 2020

(65) Prior Publication Data

US 2021/0124188 A1    Apr. 29, 2021

Related U.S. Application Data

(60) Provisional application No. 62/925,817, filed on Oct. 25, 2019.

(51) Int. Cl.
G02C 7/08    (2006.01)
G02C 7/02    (2006.01)

(52) U.S. Cl.
CPC .............. *G02C 7/085* (2013.01); *G02C 7/028* (2013.01)

(58) Field of Classification Search
CPC .......... G02C 7/085; G02C 7/028; G02C 7/04; G02C 7/049; G02C 7/08
See application file for complete search history.

(56) References Cited

U.S. PATENT DOCUMENTS

| | | |
|---|---|---|
| 2006/0268224 A1 | 11/2006 | Brent |
| 2006/0274262 A1 | 12/2006 | Andino et al. |
| 2008/0055545 A1* | 3/2008 | Clamp .................. G02C 7/048 351/159.02 |

(Continued)

FOREIGN PATENT DOCUMENTS

WO    2015095891 A1    6/2015

OTHER PUBLICATIONS

International Search Report and Written Opinion issued in corresponding International Patent Application No. PCT/GB2020/052582 dated Feb. 8, 2021 (12 pages).

(Continued)

*Primary Examiner* — Balram T Parbadia
*Assistant Examiner* — Gabriel A Sanz
(74) *Attorney, Agent, or Firm* — Kilyk & Bowersox, P.L.L.C.

(57) ABSTRACT

A method of designing a fluid-filled contact lens (103) is described. The method involves generating a computational model that includes a fluid-filled lens (103) and the shape of a cornea causes deformation of an internal structure of the fluid-filled lens (103) to generate a deformed, fluid-filled lens (103) with altered optical properties. The method also includes modelling (5) the optical properties of the deformed, fluid-filled lens (103). The shape of the fluid-filled lens (103) is then adjusted (7) to reduce the effects of the deformation on the optical properties. This is referred to as an adjusted fluid-filled lens (103). A corresponding off-eye lens design is generated (110 based on the adjusted fluid-filled lens design.

7 Claims, 6 Drawing Sheets

(56) References Cited

U.S. PATENT DOCUMENTS

| | | | | |
|---|---|---|---|---|
| 2011/0153287 A1* | 6/2011 | Potze | ............... | G02C 7/04 |
| | | | | 703/2 |
| 2014/0232982 A1* | 8/2014 | Iwai | ............... | G02C 7/085 |
| | | | | 351/159.03 |
| 2016/0377887 A1* | 12/2016 | Waite | ............... | G02C 7/083 |
| | | | | 351/159.34 |
| 2018/0107021 A1* | 4/2018 | Bishop | ............ | B24B 13/0025 |
| 2019/0258083 A1* | 8/2019 | Alster | ............... | G02C 7/047 |
| 2020/0166777 A1* | 5/2020 | Rafaeli | ............ | G02C 7/049 |

OTHER PUBLICATIONS

Demand filed Jul. 28, 2021 in corresponding International Patent Application No. PCT/GB2020/052582 (15 pages).
Written Opinion of the International Preliminary Examining Authority (Second Written Opinion) issued in corresponding International Patent Application No. PCT/GB2020/052582 dated Aug. 6, 2021 (7 pages).
International Preliminary Report on Patentability issued in corresponding International Patent Application No. PCT/GB2020/052582 dated Feb. 3, 2022 (17 pages).

* cited by examiner

METHOD OF DESIGNING A FLUID-FILLED CONTACT LENS

This application claims the benefit under 35 U.S.C. § 119(e) of prior U.S. Provisional Patent Application No. 62/925,817, filed Oct. 25, 2019, which is incorporated in its entirety by reference herein.

FIELD

The present disclosure concerns computer-implemented methods of designing fluid-filled contact lenses. More particularly, but not exclusively, this disclosure concerns computer-implemented methods of designing fluid-filled contact lenses that are adjusted to reduce the effects of deformation caused by the cornea. The disclosure also concerns manufacturing fluid-filled contact lenses based on the designed lenses.

BACKGROUND

A significant number of people suffer from myopia (short sightedness) or hyperopia (long sightedness). As people get older, they develop presbyopia (where the lens becomes less elastic and makes it more difficult for the eye to focus on near objects). A common way of correcting the vision in this situation is the use of varifocal eyeglasses. These glasses have different focal lengths near the top of the lens compared to the bottom of the lens; however, this means that vision through part of the lens is always out of focus depending on the activity of the wearer, and as such many people opt for two separate pairs of glasses: one for near sight and one for far sight. This is cumbersome and impractical.

Many people prefer to wear contact lenses, rather than conventional glasses. Conventional contact lenses are set at a specific power that is determined when the contact lens is manufactured. Various solutions have been proposed to enable a user to wear contact lenses in order to correct for effects of presbyopia. Monovision solutions have been proposed, wherein the user wears a contact lens with a different focal power in each eye. An alternative solution is the use of contact lenses that comprise concentric rings that have different focal power, thereby allowing a single contact lens to provide variable focal power by relying on the wearer to distinguish between different images produced by the different focal powers. It is desirable to have a contact lens that is capable of adjusting its power, not only for near and far sight, but also for when the strength of correction required by the eye changes with time.

Contact lenses have been proposed that have a central optical zone that can be inflated with fluid. The fluid can be provided in a chamber, which is arranged to be in front of a user's pupil when the contact lens is on an eye of a person. As the volume of fluid in the chamber changes, the chamber changes shape and thereby causes the lens to change its focal length/power. Contact lenses may be designed and/or manufactured with the intention that a pre-determined focal length/power will be provided by a lens that has been inflated with a pre-determined volume/level of fluid. The design/manufacturing process may use experimental measurements or the results of simulations to determine the volume of fluid/inflation level required to achieve a given focal length/power. However, the optical properties of a fluid-filled contact lenses have proven difficult to predict in practice. The shape of a contact lens wearer's eye has been found to influence the shape of the lens. The shape of the eye varies across the population, and this results in inconsistencies between users, in the optical performance provided by a given fluid-filled lens.

The present disclosure seeks to mitigate the above-mentioned problems. The present disclosure seeks to provide a tuneable contact lens that provides variable focal length/power, whilst providing improved optical performance compared with prior art fluid-filled lenses, and a method of designing the same.

SUMMARY

The present disclosure provides a method of designing a contact lens.

Preferred, but optional, features of the disclosure are set out in the dependent claims.

It will of course be appreciated that features described in relation to one aspect of the present disclosure may be incorporated into other aspects of the present disclosure.

DESCRIPTION OF THE DRAWINGS

Embodiments of the present disclosure will now be described by way of example only with reference to the accompanying schematic drawings.

DETAILED DESCRIPTION

Figure 1:
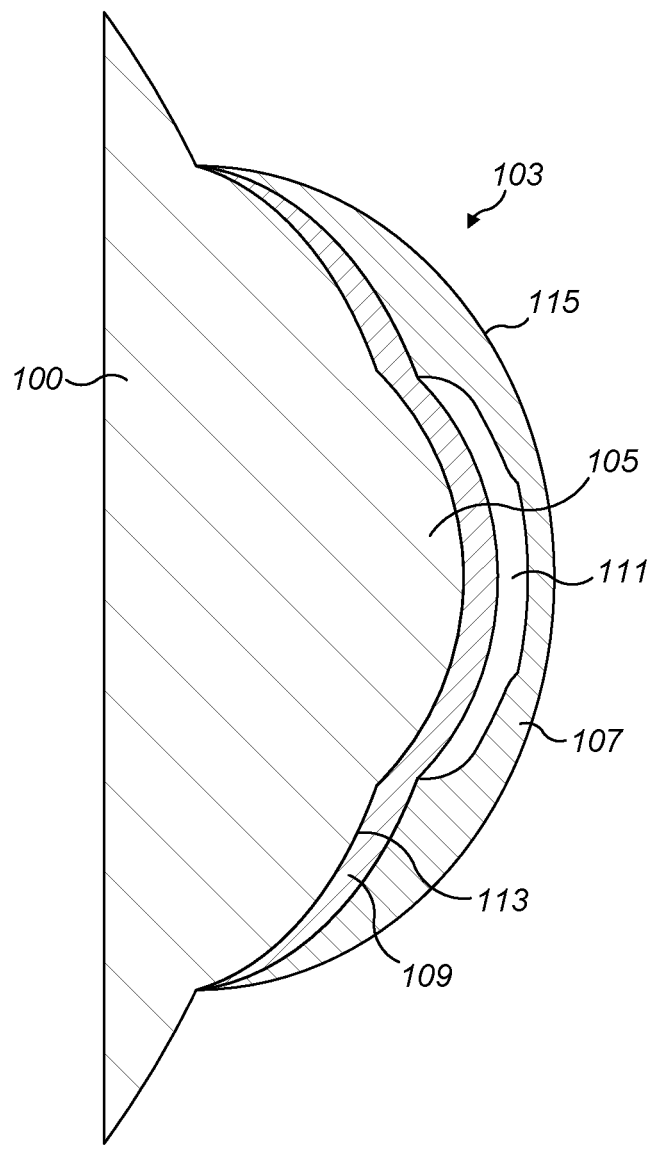
FIG. 1 is a schematic image of an eye and a fluid-filled lens, which may be modelled in accordance with the methods of the present disclosure.

According to a first aspect, the present disclosure provides a computer-implemented method of designing a fluid-filled contact lens, wherein the fluid-filled contact lens includes internal structure. The method comprises generating a computational model of a fluid-filled contact lens, wherein in the model, the shape of a cornea causes deformation to the internal structure of the fluid-filled lens, and hence causes alteration of the optical properties of the fluid-filled lens, thereby generating a deformed, fluid-filled lens. The method comprises modelling the optical properties of the deformed, fluid-filled lens, adjusting the shape of the fluid-filled lens to reduce the effects of the deformation, thereby providing an adjusted, fluid-filled lens, and generating a corresponding off-eye lens design based on the an adjusted, fluid-filled lens.

Adjusting a lens based on the optical properties of the lens that have been measured when the lens has been deformed by a cornea will reduce the effects of cornea shape and/or cornea topography on the optical performance of the lens, thereby enabling a lens to be designed that will produce a more consistent and predictable optical performance for a range of users, who may have different cornea shapes/topographies. The effects of cornea shape and/or topography on the optical performance of lenses are more pronounced for fluid-filled lenses compared to conventional hydrogel and silicone hydrogel contact lenses that do not have a fluid-filled chamber owing to the flexibility of the fluid reservoir and lens membranes. Therefore, adjusting a fluid-filled lens based on optical properties that have been measured whilst the lens is on-eye is important in enabling fluid-filled lenses with improved performance to be produced.

Cornea shapes may be classified into distinct groups, for example, different patient populations. The cornea shapes may be determined using a topographer, such as by using axial power maps, or tangential power maps, or mean curvature maps, or combinations thereof. The cornea shapes may be determined with corneal thickness maps or epithelial thickness maps that may be obtained using an optical coherence tomographer (OCT). The cornea shapes may be defined using an optical metric. For example, corneas may be classified based on their effect on a wavefront passing through the eye, for example by classifying into different groups different sets of values of the Zernike coefficients that describe the wavefront (the wavefront may of course be described by any suitable mathematical description). The lens may be deformed by a cornea that has a particular classification, to determine the optical performance for a particular group of users.

Modelling the optical properties of a fluid-filled lens that has been deformed by a cornea provides an efficient method of predicting the optical performance of a fluid-filled lens, prior to manufacturing. This may enable lenses to be designed and manufactured with predictable performance, for users with a wide range of cornea shapes/topographies, and with different optical performance requirements.

The fluid-filled lens that is being modelled may be a fluid-filled contact lens as discussed below.

The lens may be an ophthalmic lens that can be placed on the eye of a person. It will be appreciated that such a contact lens will provide clinically acceptable on-eye movement and not bind to the eye or eyes of a person. The lens may be in the form of a corneal contact lens (e.g., a lens that rests on the cornea of an eye) or a scleral contact lens (e.g., a lens that rests on the sclera of an eye).

The lens modelled in accordance with methods of the present disclosure is a fluid-filled contact lens. Fluid-filled contact lenses may be lenses that include a fluid-filled reservoir, or lenses that include a liquid crystal layer or liquid crystal cell. As used herein, a "fluid-filled reservoir" refers to a discrete location in the contact lens that contains a fluid, such as a liquid. The fluid-filled reservoir or the liquid crystal layer may be located in the central area of the contact lens thereby defining an optic zone of the contact lens.

As used herein, the term "lens member" means a component body element that is attached to other component body elements (lens members) to form a lens body. For example, a "lens member" may be a component body element shaped to receive the fluid-filled reservoir, or a "lens member" may be a component body element shaped to cover the fluid-filled component, the fluid-filled component being received in another component body element. In the context of the present disclosure, a posterior lens member is a lens member that, when a lens is provided on an eye, is positioned between the eye and the fluid-filled reservoir or liquid crystal layer. In the context of the present disclosure, an anterior lens member is a lens member that, when a lens is provided on an eye, is positioned forward of the fluid-filled reservoir or liquid crystal layer (i.e. further away from the eye than the fluid-filled reservoir or liquid crystal layer) and therefore is not in contact with the eyeball.

The fluid-filled contact lens modelled in the present disclosure may comprise a lens body, wherein the lens body comprises a first lens member and a second lens member, and a fluid-filled reservoir or liquid crystal component provided in between the first lens member and the second lens member.

The lens body may comprise at least one rigid component, said at least one rigid component being more rigid (i.e. stiffer and/or less flexible) than the first and/or second lens members. That is to say, all other factors (such factors including but not being limited to speed of deformation and direction of force) being the same, the resistance offered by the rigid component to deformation is greater than the resistance offered by the first and/or second lens members. For example, the force required per unit deformation of the rigid component (when all other factors are the same) may be at least 5%, for example at least 10%, for example at least 20% greater than the force per unit deformation of the first and/or second lens members.

The first and second lens members described herein may be planar, or may be curved. Both the first and second lens members may comprise a posterior lens surface and an anterior lens surface. The anterior surfaces of both the first and second lens members face away from the eye when the contact lens is located on an eye. The anterior surfaces may have a generally convex shape. The posterior surfaces of both the first and second lens members face towards the eye when the contact lens is located on an eye, and the posterior surfaces may have a generally concave shape.

The first lens member may be an anterior lens member. The second lens member may be a posterior lens member. The fluid-filled reservoir may be provided in a recess formed in a surface of a lens member, for example a recess formed in a posterior surface of the first, anterior, lens member or an anterior surface of the second, posterior, lens member. The posterior member, for example the anterior surface thereof, is placed in contact with the anterior member, for example the posterior surface thereof to sandwich the fluid-filled reservoir therebetween. The resulting "sandwich" assembly can be understood to form a contact lens body forming the whole or a part of a fluid-filled contact lens. Alternatively, the fluid-filled reservoir may be provided in a capsule disposed in between the first lens member and the second lens member.

The lens body may further comprise one or more rigid components, which can be placed on a surface of a lens member, for example placed on a posterior surface of the anterior lens member or an anterior surface of the posterior lens member. One or more rigid components can be received in a recess formed in a surface of a lens member, for example a recess formed in a posterior surface of the anterior lens member or an anterior surface of the posterior lens member.

The lens body (e.g. the first and second lens members, the fluid-filled reservoir or liquid crystal layer and any optional rigid components) may form the whole or a portion of a fluid-filled contact lens, for example a portion of a fluid-filled corneal contact lens or a portion of a fluid-filled scleral contact lens, for example an optic portion of a fluid-filled contact lens. The contact lens body may be substantially circular in shape and have a diameter from about 4 mm to about 20 mm. Thus, the contact lens body can have a diameter that is less than the diameter of the entire fluid-filled contact lens. In some embodiments, the contact lens body has a diameter from 5 mm to 18 mm. In further embodiments, the fluid-filled contact lens body has a diameter from 7 mm to 15 mm.

The step of generating a computational model may comprise generating a computational model of an eye having a cornea, and in the model, modelling the fluid-filled lens on the cornea such that the modelled cornea causes deformation of the fluid-filled lens. The optical properties of the deformed fluid-filled lens may be modelled whilst the lens is on-eye, and the shape of the fluid-filled lens may be adjusted whilst the lens is on-eye.

In the present disclosure, the model of the eye and the fluid-filled lens may be generated in any suitable commercially available physical simulation software that is capable of simulating forces acting between the eye and a flexible contact lens membrane. Physical simulation packages such as Comsol™ or ANSYS may be used to simulate forces acting on the fluid-filled lens. Optical modelling software such as Zemax™ may be used to model the shape of the resulting deformed lens. Zemax™ or similar optical modelling software may be used as a module within a physical simulation package, thereby enabling a deformed lens to be modelled directly from simulated forces.

The method may comprise manufacturing a fluid-filled lens based on the off-eye lens design. The fluid-filled lens may be manufactured using the methods described below. The lens may be manufactured to provide a known optical performance (determined from modelling the optical properties) for wearers with a certain corneal shape or topography.

Lens members that are modelled, and which may be manufactured using present methods and apparatus can be formed by cast molding processes, spin cast molding processes, or lathing processes, or a combination thereof. As understood by persons skilled in the art, cast molding refers to the molding of a lens member by placing a lens forming material between a female mold member having a concave lens member forming surface, and a male mold member having a convex lens member forming surface.

The lens member material, as it is used as a portion of a contact lens or as an entire contact lens is visually transparent (although it can include a handling tint). Each of the first and/or second lens members can be formed from a hydrogel material, a silicone hydrogel material, or a silicone elastomer material. Such materials may be particularly useful for corneal contact lenses. In other words, a lens member used with the present methods and apparatus can comprise, consist essentially of, or consist of a hydrogel material, a silicone hydrogel material, or a silicone elastomer material. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as used herein, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as used herein, has a water content from about 0% to less than 10% (wt/wt). Typically, the silicone elastomer materials used with the present methods or apparatus have a water content from 0.1% to 3% (wt/wt). Such materials may be particularly useful for scleral contact lenses.

The fluid provided in the fluid-filled reservoir may comprise water or an oil. The fluid may be selected to provide a required refractive index.

Silicone elastomers typically have a lower water permeability than silicone hydrogels. In the event that the first and second lens members comprise silicone elastomer, the fluid-filled reservoir may be provided in a "sandwich" assembly between the first and second lens members such that the inner surfaces of the first and second lens member define the reservoir. In the event that the first and second lens members comprise silicone hydrogel, it may be necessary to coat or surface treat the inner surfaces of the lens members to reduce their water permeability, such that the coated or surface-treated inner surfaces of the first and second lens members define the reservoir. Alternatively, the fluid-filled reservoir may be provided in a capsule disposed between the first and second lens members. The capsule may comprise silicone elastomer or a fluid-impermeable material.

Manufacturing fluid-filled lenses designed using method of the present disclosure may comprise one or more of the following steps:
  Forming a first lens member and a second lens member (a molding step or a lathing step);
  Providing each of the first lens member and the second lens member on a compliant stage or on a mold part;
  Providing a fluid-filled reservoir or a liquid crystal layer on one of the first or second lens members;
  Bringing the first and second lens members into contact such that the fluid-filled reservoir or liquid crystal layer is located therebetween (a contacting step);
  Coupling the first and second lens members to form a contact lens body (a coupling step).

Manufacturing fluid-filled lenses designed using method of the present disclosure may comprise one or more of the following additional steps:
  Removing the lens body from the compliant stage and/or mold parts;
  Washing the lens body with or without organic solvents, water, or combinations thereof;
  Packaging the lens body in a contact lens package. The contact lens package is then sealed and sterilized using conventional techniques.

The step of adjusting the shape of the fluid-filled lens may comprise comparing a measured value of an optical property of the fluid-filled lens to an expected value or range of values. The optical property may be, for example, a radius of curvature of the posterior or anterior surface of the lens, a point spread function, or a power map of the lens.

The value may be a cost function. The cost function may be based on measured Zernike coefficients of the image of the lens formed on the retina.

The comparing step may comprise comparing a measured cost function to a target value of the cost function. (The target value may be zero.)

The comparing step may comprise calculating a difference value between the measured value and the target or desired value or range of values, and adjusting the position and/or shape of the fluid-filled lens based at least in part on the difference value.

The adjusting may be carried out iteratively.

In methods of the present disclosure, the adjusted lens may be provided by re-modelling the optical properties of the adjusted fluid-filled lens and iteratively re-adjusting the shape of the fluid-filled lens to reduce the effects of deformation, to optimise the adjusted fluid-filled lens.

Each re-adjusting step may comprise re-measuring the value of the optical property of the fluid-filled lens, and the step of re-adjusting the lens may comprise comparing the re-measured value to an expected value or range of values.

Each comparing step may comprise comparing a measured cost function to a target value of the cost function. (The target value may be zero.) Each comparing step may comprise calculating a difference value between the measured value and the target or desired value or range of values, and adjusting the position and/or shape of the fluid-filled lens based at least in part on the difference value.

The re-adjusting steps may be repeated until the cost function or difference value falls below a certain threshold value. The lens may be considered to be an optimized lens if a difference value falls below 5% of the expected value, below 1%, or below 0.1% of the expected value. The re-adjusting step may be repeated until the difference value between an expected and measured radius of curvature of the posterior or anterior surface of the lens falls below 0.1%.

The method may comprise manufacturing a fluid-filled lens based on the adjusted, off-eye fluid-filled lens design. The manufactured lens may have known optical properties, determined from the difference between measured and expected optical property values, modelled using the methods set out above.

The above paragraphs describe methods of designing a fluid-filled lens according to aspects of the present disclosure. In an optional set of embodiments of these methods, within the model, the fluid-filled lens is removed from the eye as part of the method. In the event that the step of generating a computational model comprises generating a computational model of an eye having a cornea, the method of the present disclosure may comprise, within the model, removing the fluid-filled lens model from the eye, prior to the step of adjusting the shape of the fluid-filled lens.

The fluid-filled lens may be removed from the cornea, adjusted off-eye to reduce the effects of the deformation on the optical properties, replaced on the cornea, and its optical properties may be re-modelled.

Adjusting the shape of the lens may comprise adjusting the shape of an anterior lens member. Adjusting the shape of the lens may comprise adjusting the shape of an anterior surface of an anterior lens member. Adjusting the shape of the lens may comprise forming indents in an anterior surface of an anterior lens member, or altering the thickness of an anterior lens member.

The steps of removal, adjusting off-eye, replacement and remodelling may be repeated iteratively.

Providing the adjusted lens may further comprise repeating the steps of replacing the adjusted, fluid-filled lens on the cornea, re-modelling the optical properties of the re-adjusted, fluid-filled lens, removing the fluid-filled lens from the cornea, and iteratively re-adjusting the shape and/or position of the fluid-filled lens to reduce the deformation, to optimise the adjusted, off-eye, fluid filled lens.

The adjusting/re-adjusting steps may comprise comparing a measured value of the optical property of the fluid-filled lens to an expected value or range of values. Each comparing step may comprise comparing a measured cost function to a target value of the cost function. The target value may be zero. Each comparing step may comprise calculating a difference value between the measured value and the target or desired value or range of values, and adjusting the position and/or shape of the fluid-filled lens based at least in part on the difference value.

The re-modelling and re-adjusting steps may be repeated until the cost function or difference value falls below a certain threshold value. The lens may be considered to be an optimized lens if a difference value falls below 5% of the expected value, below 1%, or below 0.1% of the expected value.

The paragraphs below describe an optional set of embodiments that include a step of modelling changes to the shape of the adjusted fluid-filled lens occurring when it is removed from the cornea.

When the lens is removed from the eye, the shape of the posterior surface may change, owing to a change in forces acting on the lens. When the lens is provided on the eye, the shape of the eye results in forces acting on the lens. These forces may change the shape of the lens, and may result in an increase in the radius of curvature of the posterior surface of the lens. When the lens is removed from the eye, the forces from the eye no longer act on the lens, and the shape of the lens may change. The radius of curvature of the posterior surface of the lens may therefore decrease. These shape-change effects are more pronounced for fluid-filled lenses than for conventional lenses, as fluid-filled lenses are often very flexible, as they may comprise flexible lens members and a flexible fluid-filled reservoir or liquid crystal layer.

When designing a fluid-filled lens, it is advantageous to take into account the change in shape of the lens when it is removed from the eye. Otherwise, if a lens is manufactured off-eye, using an on-eye generated lens design, the lens may not fit as expected, and may not have expected optical properties when worn by a user, as optical properties of the lens may be influenced by the change in curvature of the lens. Removing the adjusted lens from the eye enables the change in shape when a real-world lens is removed from, or placed onto an eye, to be taken into account. This allows fluid-filled lenses to be manufactured off-eye with more predictable properties.

Modelling the changes to the shape of the lens when it is removed from the cornea may include measuring a physical parameter of the adjusted fluid-filled lens.

Modelling the changes may comprise modelling a change in the curvature of the lens when it is removed from the cornea. Modelling the change in the curvature may comprise modelling a change in the radius of curvature of the posterior surface of the adjusted fluid-filled lens when it is removed from the cornea.

FIG. 1 shows an eye 100 and a fluid-filled contact lens 103, which may be modelled in accordance with the methods of the present disclosure. The eye has a cornea 105, and the lens 103 is provided on the cornea 105. The fluid-filled lens 103 comprises a first lens member 107, a second lens member 109, and a reservoir 111 provided between the first lens member 107 and the second lens member 109 and filled with a fluid, in this example saline. The second lens member 109 provides the posterior surface of the lens 113, and the first lens member 107 provides the anterior surface of the lens 115. The shape of the cornea 105 influences the shape of the posterior surface of the lens 113. In turn, this influences distribution of the fluid within the reservoir 111 and hence influences the shape of the fluid-filled reservoir 111. The optical properties of the fluid-filled lens 103 are in turn influenced by the shape of the fluid-filled reservoir (and therefore are influenced by the shape of the cornea 105). The fluid-filled lens 103 shown in FIG. 1 is a deformed lens, as its shape, and therefore its optical properties have been influenced by the shape of the wearer's cornea 105.

An example method 1 (FIG. 2) of designing the fluid-filled contact lens 103 begins (step 3) with generating a computational model of (i) an eye having a cornea 105 and (ii) the fluid-filled lens 103 on the cornea 105. In this example method, the model is generated in commercially available physical simulation software ComSol™, which simulates the forces acting on the lens 103 as it rests on the cornea 105. As on a real eye, within the model the shape of the cornea 105 deforms the fluid-filled lens 103, because of the flexibility of its internal structure, and especially of the relatively thin regions of the first lens member 107 and the second lens member 109 where they define the walls of the reservoir 111. Optical properties of the deformed fluid-filled lens 103 are modelled (step 5), in this example by transferring information about the shape of the deformed lens to commercially available optical modelling software Zemax™. The shape of the lens 103 is adjusted (step 7) in the Zemax™ software to reduce the effects of the deformation. An off-eye lens design is generated (step 11), based on the adjusted lens shape. A fluid filled lens is manufactured based on the off-eye lens design (optional step 13).

In some embodiments, the steps of modelling the optical properties of the fluid-filled lens (step 5) and adjusting the shape of the lens (step 7) are iteratively repeated to optimize the shape of the lens (optional step 9). The off-eye lens design is then generated (step 11) based the optimized lens shape.

In an example embodiment of the disclosure, the modelling of the optical properties of the deformed lens (step 5) comprises measuring a value of an optical property of the deformed fluid-filled lens 103, in this example a cost function formed from Zernike coefficients of the image formed by the lens 103 on the retina. The step of adjusting the shape (step 7) of the fluid-filled lens 103 comprises optimizing the optical property of the lens 103 by comparing the measured value to a target value of the cost function and determining a difference value. The adjustment of the shape of the lens (step 7) is made at least in part based on the difference value. The steps of measuring a value of an optical property, comparing this value to an expected value and determining a difference value are iteratively repeated, as part of the iterative re-modelling and re-adjusting (step 9) shown in FIG. 2, until the difference value is below a pre-determined threshold value, indicating that the lens model is optimized. An off-eye lens design is then generated (step 11) based on the optimized lens model.

Figure 2:
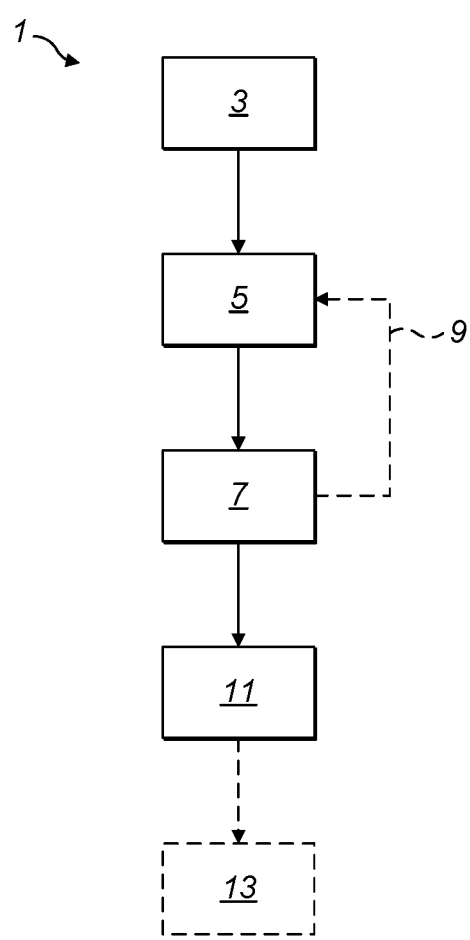
FIG. 2 is a flow chart of a method of designing a fluid-filled lens, according to an example embodiment.
Figure 3:
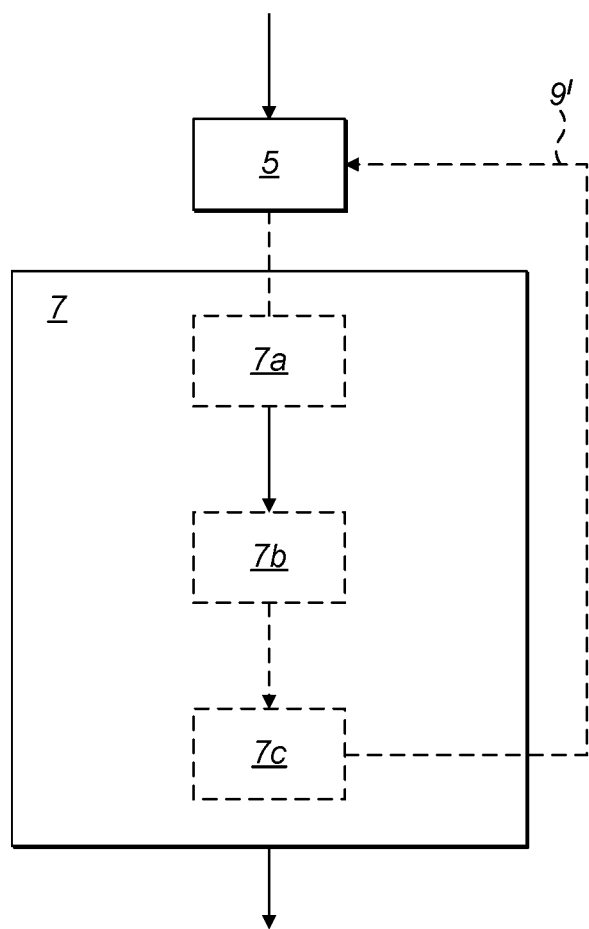
FIG. 3 is a flow chart showing step 7 of the method of FIG. 2 in more detail in an example embodiment in which the shape of the lens is adjusted off-eye.

FIG. 3 shows an example optional version of the method 1 of FIG. 2. The step 7 of adjusting the shape of the lens 103, comprises the following sub-steps. In step 7a, the fluid-filled lens 103 is removed from the cornea 105. In step 7b, the shape and of the lens 103 is adjusted to reduce the effects of deformation, and in step 7c, the adjusted lens 103 is replaced on the cornea 105. As part of an iterative process 9', optical properties of the lens 103 may be re-modelled, thereby repeating step 5, and steps 7a, 7b and 7c may be iteratively repeated to optimise the lens 103.

Figure 4B:
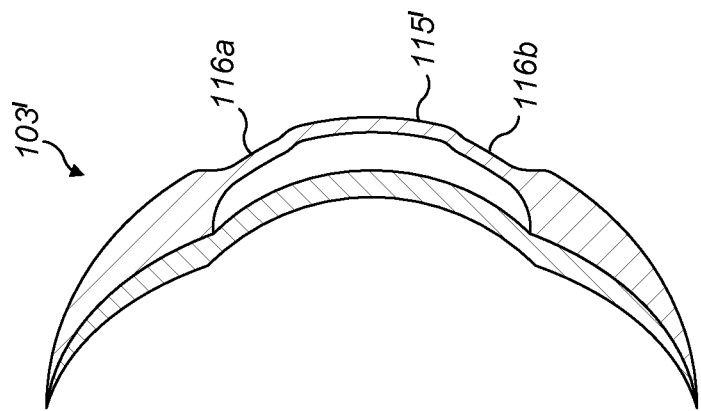
FIG. 4B is a schematic image of the fluid-filled lens of FIG. 4B after it has been removed from the eye and adjusted according to an example embodiment.
Figure 4A:
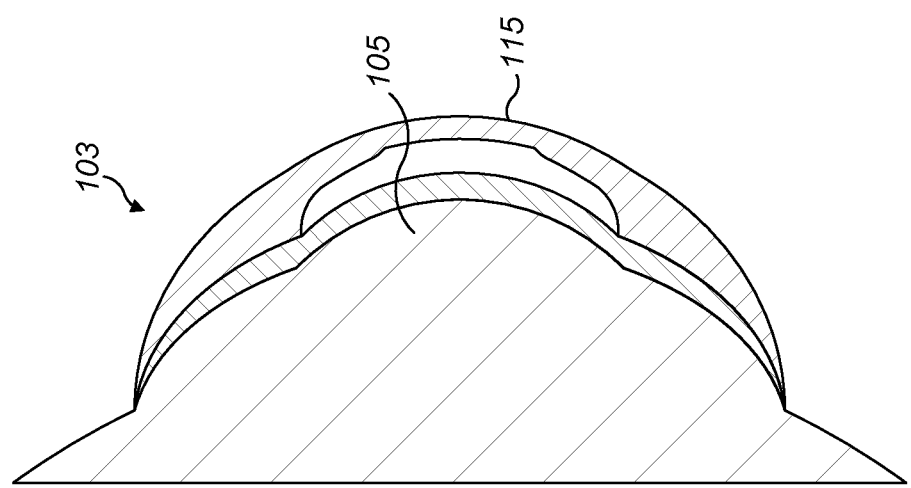
FIG. 4A is a schematic image of an eye and a fluid-filled lens prior to adjustment according to an example embodiment.

FIGS. 4A and 4B show an example method of adjusting the shape of the fluid-filled lens 103 shown in FIG. 1, whilst the lens is off-eye in order to reduce the effects of deformation 700. FIG. 4A shows the deformed fluid-filled lens 103. FIG. 4B shows an adjusted lens 103', in which the shape of the anterior surface 115 has been adjusted to reduce the deformation of the lens 103 caused by the shape of the cornea 105. Indented regions 116a, 116b have been formed in the anterior surface 115' to compensate for the deformation to the fluid-filled lens that has been caused by the shape of the cornea 105.

Figure 5:
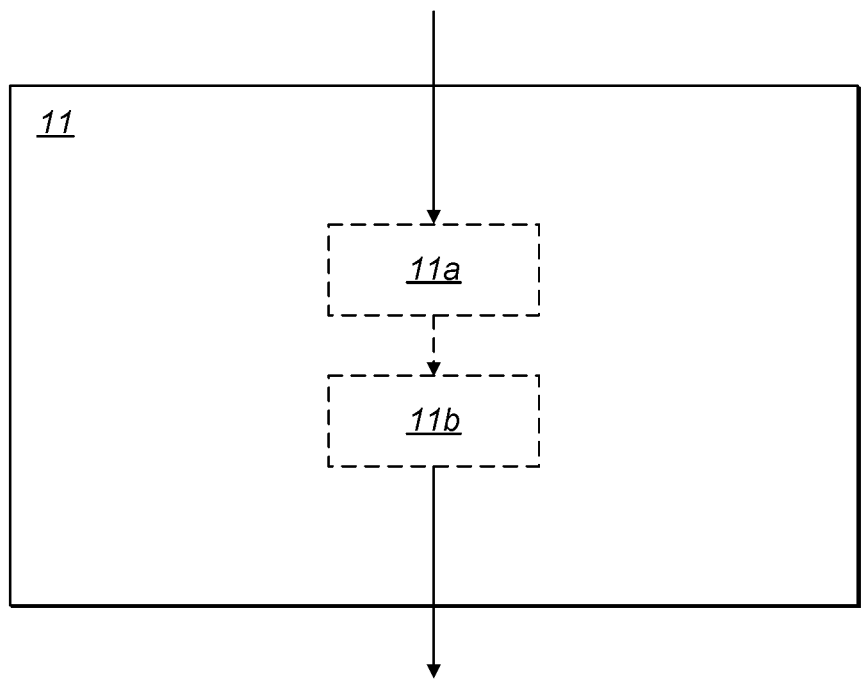
FIG. 5 is a flow chart showing step 11 of the method of FIG. 2 in more detail in an example embodiment in which the shape of an optimised lens is adjusted off-eye to produce an off-eye lens design.

FIG. 5 shows a further example optional version of the method 1 of FIG. 2. As part of the step 11 of generating a fluid-filled lens design based on an adjusted fluid-filled lens, the following steps are performed. In step 11a, the adjusted fluid-filled lens generated in step 7 is removed from the eye, to generate an off-eye, adjusted, fluid-filled lens model. In step 11b, the radius of curvature of the adjusted, off-eye, fluid-filled lens is measured. The fluid-filled lens design is generated, based on this off-eye, adjusted lens.

Figure 6B:
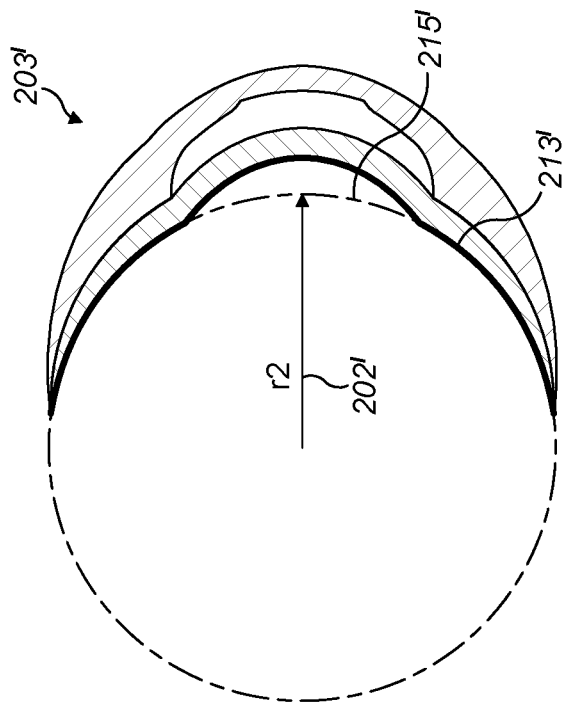
FIG. 6B is a schematic image of the lens of FIG. 6A, once the lens has been removed from the eye, according to the example embodiment.
Figure 6A:
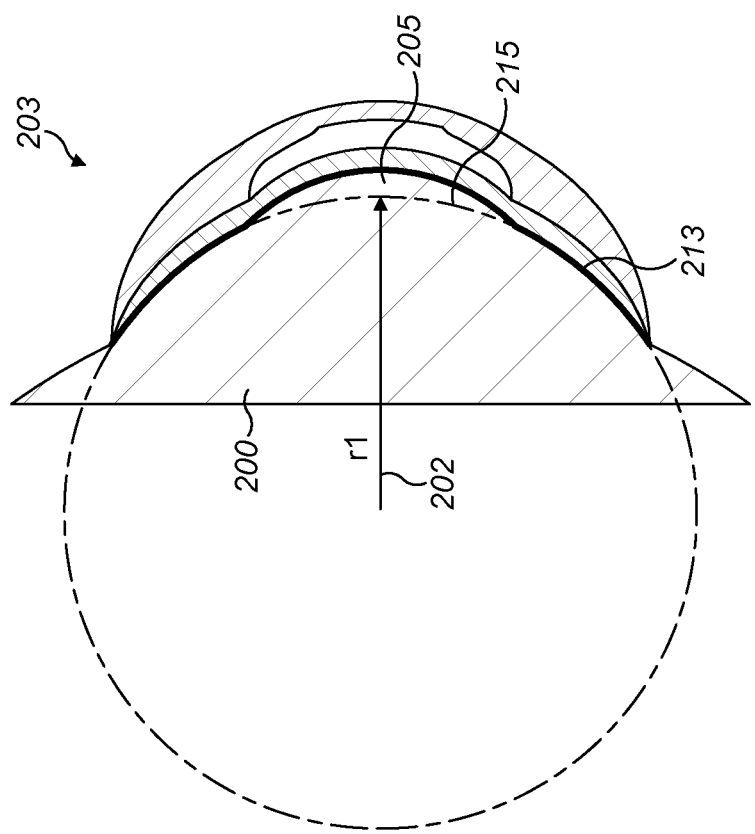
FIG. 6A is a schematic image of an optimised fluid-filled lens provided on an eye, according to an example embodiment.

FIGS. 6A and 6B illustrate an example implementation of the method of FIG. 5. In FIG. 6A, an adjusted lens 203 is provided on the eye 200. The posterior surface of the lens 213 has a shape 215 (indicated by the dashed circle) that is at least in part determined by the shape of the cornea. This shape has a radius of curvature (r1 in FIG. 6A) 202 of the surface posterior surface 213. FIG. 6B shows the adjusted lens 203' once it has been removed from the cornea 205. When the adjusted lens 203 is removed from the eye 200, the shape of the posterior surface 213' of the lens 203' changes, as indicated by the change in shape of the dashed circle 215'. The radius of curvature 202' (indicated by r2 in FIG. 6B) of the posterior surface 213' increases when the adjusted lens 203' is removed from the eye 200, i.e. the lens 203' becomes flatter off the eye.

In order to manufacture a fluid-filled contact lens based on the lens design generated in step 11 of FIG. 2, physical parameters of the adjusted lens 203 are required. However, the value of these parameters may change when the adjusted lens 203 is removed from the eye 200, owing to a change in shape of the adjusted lens 203' and a change in the shape of the posterior surface 213' of the adjusted lens 203' as indicated by FIG. 6B. Therefore, in step 11b of FIG. 5, the radius of curvature (r2, 202') of the posterior surface 213' of the adjusted, off-eye lens 203' is measured. A lens design is generated, based on this off-eye, adjusted lens, using the measured radius of curvature (r2, 202').

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A computer-implemented method of designing a fluid-filled contact lens, wherein the fluid-filled contact lens includes a fluid filled reservoir, the method comprises:
   (a) generating a computational model, wherein the computational model comprises a fluid-filled lens and an eye having a cornea, and wherein in the computational model, the fluid-filled lens is modelled on the cornea such that simulated forces of a shape of the cornea act on the fluid-filled lens, which cause deformation to a fluid filled reservoir provided between a first lens member and a second lens member of the fluid-filled lens, and hence alters the optical properties of the fluid-filled lens, thereby generating a deformed, fluid-filled lens;
   (b) modelling the optical properties of the deformed, fluid-filled lens;

(c) within the computational model, removing the fluid-filled lens from the cornea and adjusting the shape of the fluid-filled lens off-eye to reduce the effects of the deformation on the optical properties, thereby providing an adjusted fluid-filled lens; and
(d) generating a corresponding off-eye lens design based on the adjusted fluid-filled lens;
(e) manufacturing a fluid-filled lens based on the off-eye lens design.

2. The method of claim 1, wherein the step of adjusting the shape of the fluid-filled lens comprises comparing a measured value of an optical property of the fluid-filled lens to an expected value or range of values.

3. The method of claim 1, wherein the adjusting is carried out iteratively.

4. The method of claim 1, wherein the fluid-filled lens is removed from the cornea, adjusted off-eye to reduce the effects of the deformation on the optical properties, replaced on the cornea, and its optical properties are re-modelled.

5. The method of claim 4, wherein the removal, adjusting off-eye, replacement and remodelling are repeated iteratively.

6. The method of claim 4, further comprising modelling changes to the shape of the adjusted fluid-filled lens occurring when it is removed from the cornea.

7. The method of claim 6, wherein the modelling the changes comprises modelling a change in the curvature of the lens when it is removed from the cornea.

* * * * *